US012613985B2

(12) United States Patent
Verma et al.

(10) Patent No.: US 12,613,985 B2
(45) Date of Patent: Apr. 28, 2026

(54) MULTI-SILOED DATABASE

(71) Applicant: Bank of America Corporation,
Charlotte, NC (US)

(72) Inventors: Sanjeev Verma, Harrisburg, NC (US);
Manu Kurian, Dallas, TX (US)

(73) Assignee: Bank of America Corporation,
Charlotte, NC (US)

( * ) Notice: Subject to any disclaimer, the term of this
patent is extended or adjusted under 35
U.S.C. 154(b) by 464 days.

(21) Appl. No.: 18/143,136

(22) Filed: May 4, 2023

(65) Prior Publication Data

US 2024/0370580 A1 Nov. 7, 2024

(51) Int. Cl.
G06F 21/62 (2013.01)
G06F 21/60 (2013.01)

(52) U.S. Cl.
CPC ........ G06F 21/6218 (2013.01); G06F 21/604
(2013.01)

(58) Field of Classification Search
CPC ................. G06F 21/6218; G06F 21/62; G06F
2221/2113; H04L 63/105; H04L 63/10
See application file for complete search history.

(56) References Cited

U.S. PATENT DOCUMENTS 9,294,507 B1 * 3/2016 Roth ..................... H04L 63/105
9,514,319 B2 * 12/2016 Mattsson ............ G06F 21/6209

11,392,714 B1 * 7/2022 Matthews ............. H04L 9/0894
11,397,824 B2 * 7/2022 Racz ..................... H04N 21/234
12,411,974 B2 * 9/2025 Racz ....................... G06F 16/93
2012/0209884 A1 * 8/2012 Mattsson ............ G06F 21/6209
707/783
2016/0205110 A1 * 7/2016 Roth ....................... G06F 9/455
726/7
2018/0232524 A1 * 8/2018 Allo ...................... G06F 21/602
2020/0372163 A1 * 11/2020 Chung .............. G06F 16/1734
2021/0216657 A1 * 7/2021 Saad ..................... G06F 3/0623
2023/0018820 A1 * 1/2023 Rudrabhatla ....... G06F 12/1491
2024/0143821 A1 * 5/2024 Racz ..................... H04L 63/105

* cited by examiner

*Primary Examiner* — Tae K Kim
(74) *Attorney, Agent, or Firm* — Weiss & Arons LLP

(57) ABSTRACT

Apparatus and method for using a siloed data mesh to store
and access data is provided. The apparatus and method may
include transmitting a dataset to a data mesh. Methods may
include analyzing data included in the dataset at a data
ingestion engine. Methods may include fragmenting the
data. Methods may include assigning a security clearance
level to each data fragment. Methods may include aggre-
gating the data fragments to form data segments. Methods
may include transmitting each data segment to a correspond-
ing data silo. Methods may include storing each data seg-
ment. Methods may include creating a storage map of where
each data segment is stored. The apparatus and method may
further include receiving a data request. Methods may
include using the storage map to locate the data segments.
Methods may include determining if one or more of the data
segments has an assigned security clearance level that is less
than a security clearance level assigned to a node. Methods
may include requesting the data. Methods may include
recreating the dataset based on the assigned security clear-
ance level of the data.

18 Claims, 8 Drawing Sheets

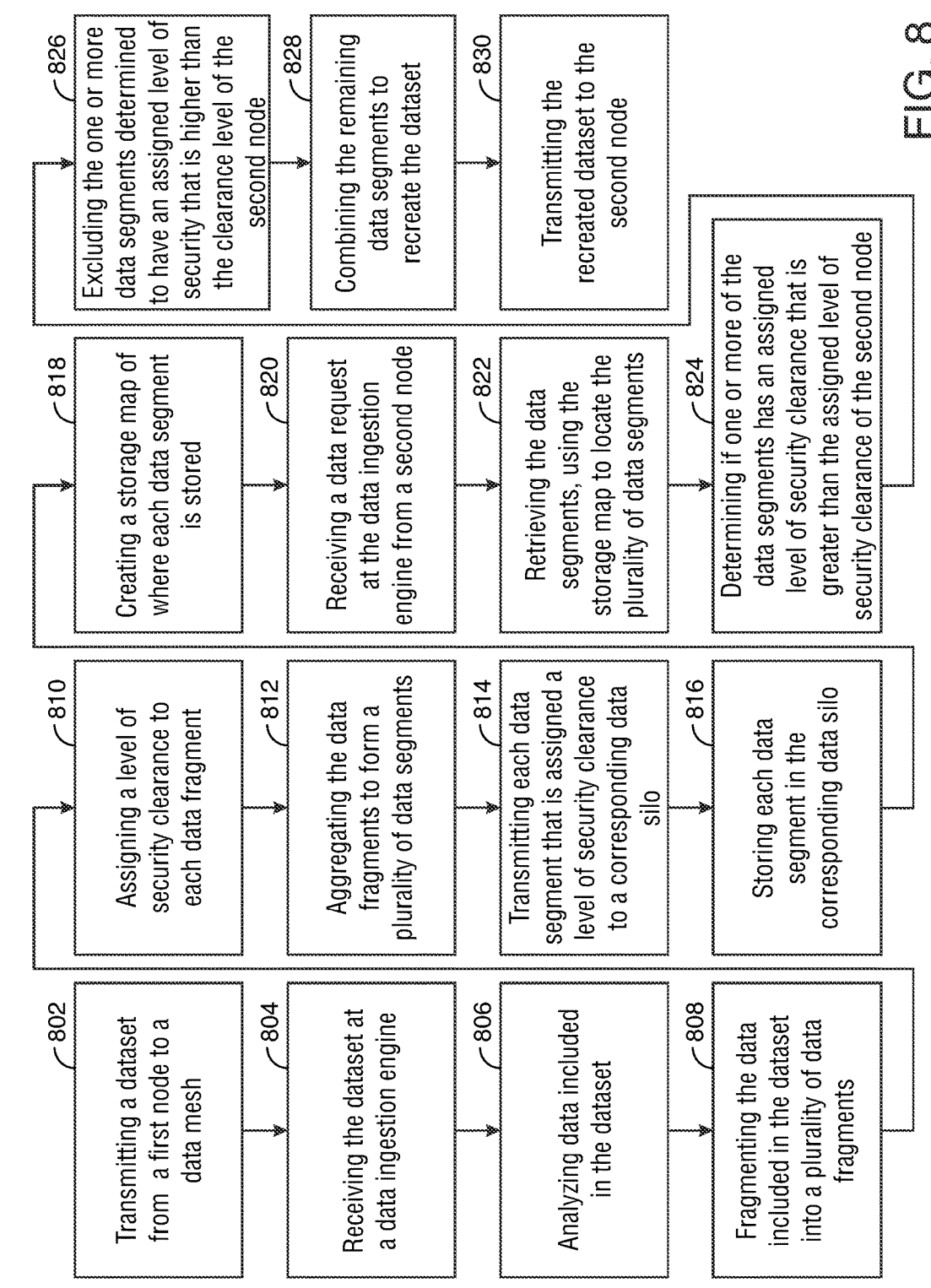

802 Transmitting a dataset from a first node to a data mesh

804 Receiving the dataset at a data ingestion engine

806 Analyzing data included in the dataset

808 Fragmenting the data included in the dataset into a plurality of data fragments 810 Assigning a level of security clearance to each data fragment 812 Aggregating the data fragments to form a plurality of data segments 814 Transmitting each data segment that is assigned a level of security clearance to a corresponding data silo 816 Storing each data segment in the corresponding data silo 818 Creating a storage map of where each data segment is stored 820 Receiving a data request at the data ingestion engine from a second node 822 Retrieving the data segments, using the storage map to locate the plurality of data segments 824 Determining if one or more of the data segments has an assigned level of security clearance that is greater than the assigned level of security clearance of the second node 826 Excluding the one or more data segments determined to have an assigned level of security that is higher than the clearance level of the second node 828 Combining the remaining data segments to recreate the dataset 830 Transmitting the recreated dataset to the second node

MULTI-SILOED DATABASE

FIELD OF TECHNOLOGY

The field of technology relates to siloed data storage.

BACKGROUND OF THE DISCLOSURE

Many entities may receive datasets along with a variety of daily interactions. Datasets may include all different types of data. Data may include private data. Data may include public data. The datasets may be stored at many different computing devices. The datasets may be stored locally on the computing devices. Storing data locally on computing devices may lead to multiple excess copies of the data. Storing multiple copies of data may consume additional space and unnecessarily lower a network's processing capacity. As such, storing multiple copies of a dataset may increase retrieval time of a dataset.

Therefore, it would be desirable to store unique copies of datasets at a multi-siloed database. The database and the datasets stored within may be accessible by multiple users within the entity. However, at times, datasets may include classified information. As such, storing the datasets at a multi-siloed database may decrease the security of the classified datasets, specifically because multiple users may have access to the database.

Therefore, it may be desirable to provide a system for multi-level security-based data storage in the multi-siloed database. It may be desirable to provide a system for securely storing and accessing the dataset anywhere in the network.

SUMMARY OF THE DISCLOSURE

Systems, apparatus and methods for a multi-level security-based data storage in a multi-siloed database are provided.

The apparatus may include a network. The network may be an edge network. The network may be a local area network (LAN). The network may be a wide area network (WAN). The network may be any suitable network. The network may include a plurality of nodes. The plurality of nodes may include laptops, desktops, tablets, smartphones, mainframes and any other suitable computing devices.

The apparatus may include a data mesh. The data mesh may be a decentralized data storage system. The data mesh may include a plurality of data silos. Each of the data silos may be associated with one of the plurality of nodes. Each of the data silos may be in electronic communication with the remaining data silos included in the plurality of data silos. Data may be transmitted from one data silo to another. Each data silo may be assigned a security clearance level. The security clearance level may be a predetermined security clearance level. The predetermined security clearance level may correspond to a predetermined security clearance level included in a plurality of predetermined levels of security clearance.

The plurality of predetermined levels of security clearance may include levels ranging from a high security clearance level to a low security clearance level. The levels may be assigned a corresponding number value. A level 1 security clearance level may correspond to a low security clearance level. The level 1 security clearance level may allow for minimal access to data. A level 5 security clearance level may correspond to a high security clearance level. The level 5 security clearance level may allow for access to most of the data. Security clearance levels may include a level 2 security clearance level, a level 3 security clearance level, a level 4 security clearance level and any other suitable security clearance level.

In an entity, a level 1 security clearance level may allow for viewing non-specific customer data. Data may include stores in which customers shop, overall spending habits of customers, demographic of customers and the like. A level 5 security clearance level may allow for viewing specific customer data. Data may include names of customers, customer identifications, social security numbers, account balances and the like. Level 2 through level 4 data may allow for varying degrees of access to the data, ranging from least customer specific to most customer specific.

The apparatus may include a data ingestion engine. The data ingestion engine may run an artificial intelligence (AI) model. The data ingestion engine may receive a dataset. The data ingestion engine may receive the dataset from a node. The dataset may comprise data. The data ingestion engine may use the AI model to analyze the data. The AI model may analyze a bank statement, a loan request, customer transactions and any other suitable dataset. The data may be analyzed in response to receipt of the dataset. The dataset may be analyzed to determine what information is included in the dataset. The dataset may be analyzed to determine how to fragment the data. The data may be analyzed to determine what security clearance level should be given to each data fragment.

The data ingestion engine system may include hardware components. The data ingestion engine may include software components. The data ingestion engine may include a computing device. The data ingestion engine may include a hardware processor. The data ingestion engine may include a hardware memory.

The data ingestion engine may fragment the data. The data ingestion engine may separate the data. The data ingestion engine may fragment the data into a plurality of data fragments. The data ingestion engine may assign a security clearance level to each data fragment. The data ingestion engine may use the AI model to assign a security clearance level to each data fragment. The data ingestion engine may use user-set security levels to assign a security clearance level to each data fragment. The data ingestion engine may use a look up table to assign a security clearance level to each data fragment. The assigned level may correspond to a predetermined security clearance level included in the plurality of predetermined levels of security clearance.

The data ingestion engine may create a plurality of data segments. Each data segment may correspond to a specific security clearance level. Each data segment may include one or more data fragments that are assigned a security level that corresponds to the specific security clearance level of the data segment.

The data ingestion engine may transmit each data segment to a data silo. The data silo may correspond to the security clearance level assigned to the data segment. The data ingestion engine may store each data segment that is assigned a security clearance level in the data silo that corresponds to the security clearance level assigned to the data segment. For example, a data segment may be assigned a level 2 security clearance level. As such, the data segment may be stored at a data silo that is assigned a level 2 security clearance level.

The data ingestion engine may create a storage map. The storage map may include each data segment. The storage map may include the data silo in which the data segment is stored. The storage map may include the corresponding security clearance level of the data segment and/or the data silo.

The network may include a node. The node may be identified as a first node. The node may include a dataset. The dataset may be identified as a first dataset. The data ingestion engine may receive a data request. The data request may be initiated at a second node. The second node may also be included in the network. The data request may include a request for the dataset. In response to the receipt of the data request, the data ingestion engine may retrieve location information for each of the plurality of data segments that constitute the dataset. The data ingestion engine may retrieve the location information for each of the plurality of data segments using the storage map. The plurality of data segments may be stored at different data silos.

In response to a determination that one or more of the data segments has been assigned a security clearance level that is greater than a security clearance level assigned to the second node, the data ingestion engine may remove the one or more data segments from the dataset. In response to a determination that one or more of the data segments has been assigned security clearance level that is greater than a security clearance level assigned to the second node, the data ingestion engine may generate a second dataset from the remainder of the dataset. For example, data segments that were assigned a security clearance level less than or equal to the security clearance level of the second node may be combined to create a second dataset.

The data ingestion engine may transmit the second dataset to the second node. The data ingestion engine may be configured to store one or more data segments that were removed from the dataset. The one or more data segments that were removed may be stored in a data silo. The data silo may correspond to the security clearance level assigned to the data segments that were removed. At times, the data ingestion engine may be configured to delete one or more data segments that were removed from the dataset.

The data ingestion engine may receive a data request. The data request may be initiated from a second node. The data request may include a request for a data segment. In response to the receipt of the data request the data ingestion engine may be configured to retrieve the data segment. The data segment may be retrieved using the storage map.

In response to a determination that the data segment has been assigned a security clearance level that is lower than a security clearance level assigned to the second node, the data ingestion engine may transmit the data segment to the second node.

In response to the determination that the data segment has been assigned a security clearance level that is greater than a security clearance level assigned to the second node, the data ingestion engine may prevent transmission of the data segment to the second node.

The data ingestion engine may use training datasets to train the AI model. The data ingestion engine may also use testing datasets to train the AI model.

The data ingestion engine may use a machine learning algorithm to use previously captured data to create training datasets. Training datasets may include a plurality of previously analyzed data. The previously analyzed data may accurately classify data by security clearance level and thereby train the AI model. Training data sets may be used by the system to recognize new security clearance levels. The newly recognized security clearance levels may be added to the group of predetermined security clearance levels.

Testing data sets may be comprised of randomly selected data fragments. A computer-based testing data set may test the accuracy of the security clearance level assigned to the selected data fragments. The testing data set may help improve the accuracy of the AI model. The testing data set may determine if the newly recognized security clearance levels are effective in classifying the security levels of the data fragments.

Each data silo may be associated with a node. Each data silo and its associated node may be configured to operate in a single domain. Domain for the purpose of this application may be understood to mean an aggregation of entities organized around a common functional entity purpose. Each domain may include customized controls, preset conditions and any other suitable domain differentiation. The domains for each pairing of a data silo and node may be unique. The domains may be industry specific. The domains may be task specific. Each domain may be assigned and or with a security clearance level. The assigned clearance level may be determined based on data characteristics for each domain.

The data ingestion engine may determine a security clearance level for each data fragment. The data ingestion engine may determine a security clearance level using the analyzed data included in the dataset. The data ingestion engine may determine a security clearance level using a metadata set of the data. The data ingestion engine may determine a security clearance level using historical background associated with the data.

The data ingestion engine may also change a storage location of a data segment. The data ingestion engine may change the location of a data segment within the data mesh. The storage location may be changed in response to a change in an assigned security clearance level. The storage location may be changed because of a lack of space within the data silo. The data ingestion engine may be further operable to update the data storage map with the changed location of a data segment.

BRIEF DESCRIPTION OF THE DRAWINGS

The objects and advantages of the invention will be apparent upon consideration of the following detailed description, taken in conjunction with the accompanying drawings, in which like reference characters refer to like parts throughout and in which:

FIG. 8 shows an illustrative flow chart in accordance with principles of the invention.

DETAILED DESCRIPTION OF THE DISCLOSURE

Figure 1:
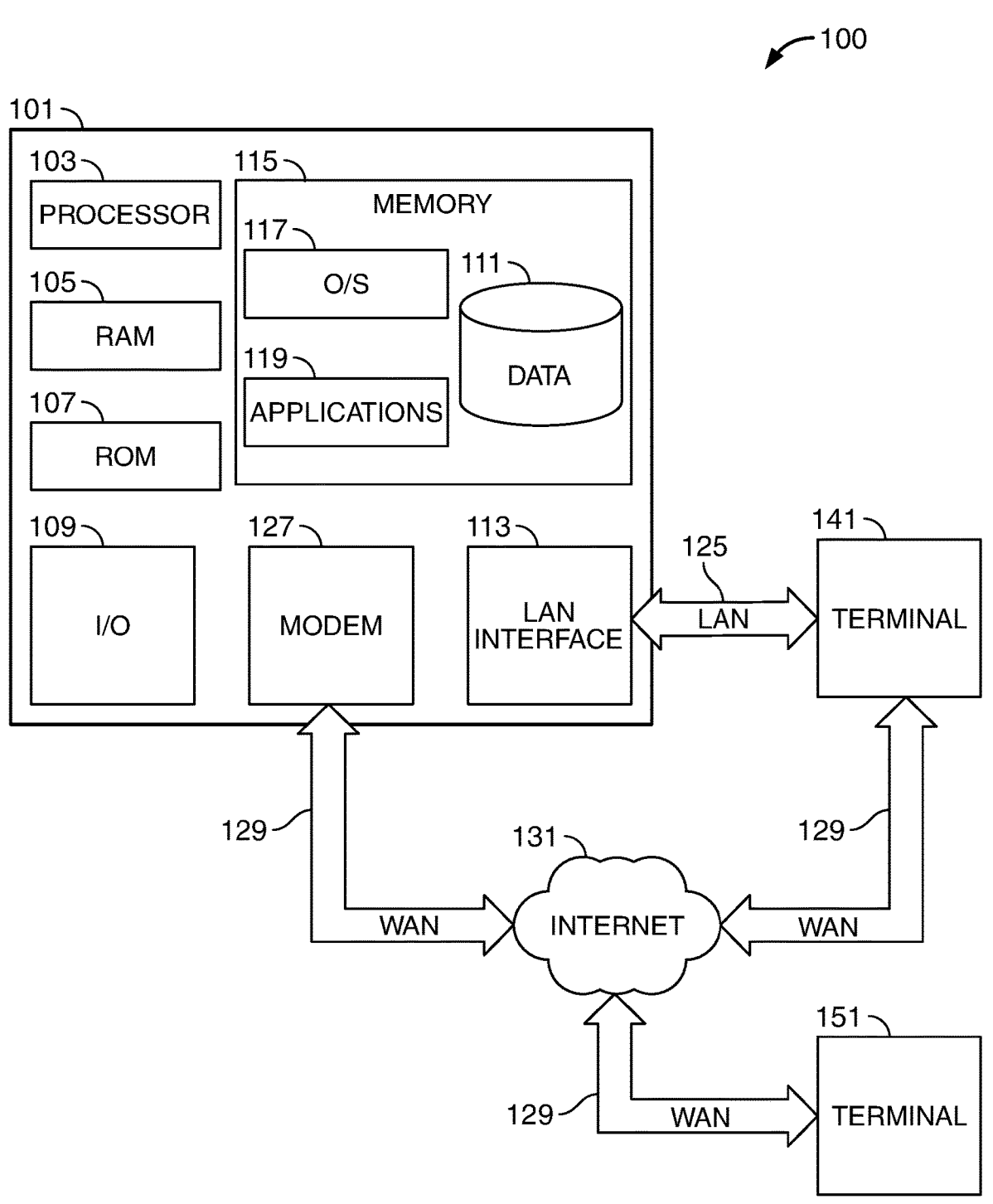
FIG. 1 shows an illustrative diagram in accordance with principles of the invention.

Apparatus, methods and systems for multi-level security-based data storage in a multi-siloed database are provided.

Methods may include transmitting a dataset from a node to a data mesh. The node may be included in a network. The network may include a plurality of nodes.

Methods may include receiving the dataset at a data ingestion engine. The data ingestion engine may run an artificial intelligence model. The dataset may include data.

Methods may include analyzing the data included in the dataset. The data may be analyzed in response to receiving the dataset. Analyzing the data may include using the artificial intelligence model to classify the data by topic. Topics may include customer name, customer financial information, customer historical information, customer identification information, or any other suitable topic included in a dataset.

Methods may include fragmenting the dataset into a plurality of data fragments. The data may be fragmented based on the classification of the data. The data may be fragmented based on any other classification, such as data relevance and data size. Methods may include assigning a security clearance level to each data fragment. Each security level may correspond to a predetermined security clearance level. The predetermined security clearance level may be included in a plurality of predetermined levels of security clearance.

Methods may include creating a plurality of data segments. Each of the plurality of data segments may correspond to a specific security clearance level. Each of the plurality of data segments may include one or more data fragments that are assigned a security level that corresponds to the specific security clearance level of the data segment. Creating a plurality of data segments may include aggregating the data fragments based on the assigned security clearance level.

Methods may include transmitting each data segment to a data silo that corresponds to the security clearance level assigned to the data segment. The data silo may be included in the data mesh. The data mesh may include a plurality of data silos. Each of the data silos may be associated with one of the plurality of nodes. Each of the data silos may be in electronic communication with the remaining data silos included in the plurality of data silos. Each of the data silos may be assigned a predetermined security clearance level that corresponds to one predetermined security clearance level included in the plurality of predetermined levels of security clearance.

Methods may include storing each data segment. Each data segment may be stored in a data silo that is assigned a security clearance level that corresponds to the security clearance level assigned to the data segment.

Methods may include creating a storage map. The storage map may include each data segment. The storage map may include the data silo in which the data segment is stored. The storage map may include the corresponding security clearance level of the data segment and the data silo.

In some embodiments, the node identified as a first node and the dataset may be identified as a first dataset. Methods may include receiving a data request at the data ingestion engine. The data request may be transmitted from a second node. The second node may be included in the network. The data request may request the dataset.

In response to the receiving the data request, methods may include retrieving a location for each of the plurality of data segments. The retrieving may include using the storage map to identify a location for each of the plurality of data segments. The plurality of data segments may be stored at different data silos.

In response to determining that one or more of the data segments has been assigned security clearance level that is greater than a security clearance level assigned to the second node, methods may include removing from the dataset the one or more data segments. In response to determining that one or more of the data segments has been assigned security clearance level that is greater than a security clearance level assigned to the second node, methods may include generating a second dataset from the remainder of the dataset. Methods may include transmitting the second dataset to the second node.

Methods may include storing one or more data segments that were removed from the dataset in a data silo. The data silo may correspond to the security clearance level assigned to the data segments that were removed. Methods may include deleting the one or more data segments that were removed from the dataset.

Methods may include receiving a data request from a second node. The data request may request a data segment. In response to receiving the data request, methods may include retrieving the data segment. Methods may include retrieving the data segment using the storage map. In response to determining that the data segment has an assigned security clearance level that is lower than an assigned security clearance level of the second node, methods may include transmitting the data segment to the second node. In response to determining that the data segment has an assigned security clearance level that is greater than an assigned security clearance level assigned to the second node, methods may include preventing or halting transmission of the data segment to the second node.

Methods may include using training datasets to train the artificial intelligence model. Methods may include using testing datasets to train the artificial intelligence model.

Each data silo may be associated with a node. Each data silo and its associated node may be configured to operate in a single domain. Domain for the purpose of this application may be understood to mean an aggregation of entities organized around a common functional entity purpose. Each domain may include customized controls, preset conditions and any other suitable domain differentiation. The domains for each pairing of a data silo and node may be unique. The domains may be industry specific. The domains may be task specific. Each domain may have an associated security clearance level. The associated security clearance level may be determined based on data characteristics for each domain.

Methods may include determining a security clearance level for each data fragment. Determining a security clearance level may include using the analyzed data included in the dataset. Determining a security clearance level may include using a metadata set of the data. Determining a security clearance level may include using historical background associated with the data.

Methods may include changing a storage location of a data segment. The data ingestion engine may change the location of a data segment within the data mesh. Methods may include updating the data storage map with the changed location of a data segment.

Illustrative method steps may be combined. For example, an illustrative method may include steps shown in connection with another illustrative method.

The steps of methods may be performed in an order other than the order shown or described herein. Embodiments may omit steps shown or described in connection with illustrative methods. Embodiments may include steps that are neither shown nor described in connection with illustrative methods.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative block diagram of system 100 that includes computer 101. Computer 101 may alternatively be referred to herein as an "engine," "server" or a "computing device." Computer 101 may be a workstation, desktop, laptop, tablet, smart phone, or any other suitable computing device. Elements of system 100, including computer 101, may be used to implement various aspects of the systems and methods disclosed herein. Each of the nodes, the data ingestion engine and the data silos may include some or all of apparatus included in system 100.

Computer 101 may have a processor 103 for controlling the operation of the device and its associated components and may include RAM 105, ROM 107, input/output circuit 109 and a non-transitory or non-volatile memory 115. Machine-readable memory may be configured to store information in machine-readable data structures. The processor 103 may also execute all software running on the computer—e.g., the operating system and/or voice recognition software. Other components commonly used for computers, such as EEPROM or Flash memory or any other suitable components, may also be part of the computer 101.

Memory 115 may be comprised of any suitable permanent storage technology—e.g., a hard drive. The memory 115 may store software including the operating system 117 and application(s) 119 along with any data 111 needed for the operation of the system 100. Memory 115 may also store videos, text and/or audio assistance files. Data silos included in the data mesh, nodes and the data ingestion engine may have one or more features in common with Memory 115. The data stored in Memory 115 may also be stored in cache memory, or any other suitable memory.

Input/output ("I/O") module 109 may include connectivity to a microphone, keyboard, touch screen, mouse and/or stylus through which input may be provided into computer 101. The input may include input relating to cursor movement. The input/output module may also include one or more speakers for providing audio output and a video display device for providing textual, audio, audiovisual and/or graphical output. The input and output may be related to computer application functionality.

System 100 may be connected to other systems via a local area network (LAN) interface 113. System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 3 include a local area network (LAN) 125 and a wide area network (WAN) 129 but may also include other networks. When used in a LAN networking environment, computer 101 is connected to LAN 125 through a LAN interface or adapter 113. When used in a WAN networking environment, computer 101 may include a modem 127 or other means for establishing communications over WAN 129, such as Internet 131. Connections between System 100 and Terminals 151 and/or 141 may be used for the nodes included in the network to communicate with the data silos.

It will be appreciated that the network connections shown are illustrative and other means of establishing a communications link between computers may be used. The existence of various well-known protocols such as TCP/IP, Ethernet, FTP, HTTP and the like is presumed and the system can be operated in a client-server configuration to permit retrieval of data from a web-based server or API. Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 119, which may be used by computer 101, may include computer executable instructions for invoking functionality related to communication, such as e-mail, Short Message Service (SMS) and voice input and speech recognition applications. Application program(s) 119 (which may be alternatively referred to herein as "plugins," "applications," or "apps") may include computer executable instructions for invoking functionality related to performing various tasks. Application programs 119 may utilize one or more algorithms that process received executable instructions, perform power management routines or other suitable tasks. Application programs 119 may utilize one or more decisioning processes for the processing of calls received from calling sources as detailed herein.

Application program(s) 119 may include computer executable instructions (alternatively referred to as "programs"). The computer executable instructions may be embodied in hardware or firmware (not shown). Computer 101 may execute the instructions embodied by the application program(s) 119 to perform various functions.

Application program(s) 119 may utilize the computer-executable instructions executed by a processor. Generally, programs include routines, programs, objects, components, data structures, etc. that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage and process data (e.g., "cloud computing" and/or "fog computing").

Any information described above in connection with database 111 and any other suitable information, may be stored in memory 115. One or more of applications 119 may include one or more algorithms that may be used to implement features of the disclosure comprising the call processing, routing, augmentation and/or any other tasks described herein.

The invention may be described in the context of computer-executable instructions, such as applications 119, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered for the purposes of this application, as engines with respect to the performance of the particular tasks to which the programs are assigned.

Computer 101 and/or terminals 141 and 151 may also include various other components, such as a battery, speaker and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 151 and/or terminal 141 may be portable devices such as a laptop, cell phone, tablet, smartphone, or any other computing system for receiving, storing, transmitting and/or displaying relevant information. Terminal 151 and/or terminal 141 may be one or more data sources or a calling source. Terminals 151 and 141 may have one or more features in common with apparatus 101. Terminals 115 and 141 may be identical to system 100 or different. The differences may be related to hardware components and/or software components.

The invention may be operational with numerous other general purpose or special purpose computing system environments or configurations. Examples of well-known computing systems, environments and/or configurations that may be suitable for use with the invention include, but are not limited to, personal computers, server computers, handheld or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices and the like.

Figure 2:
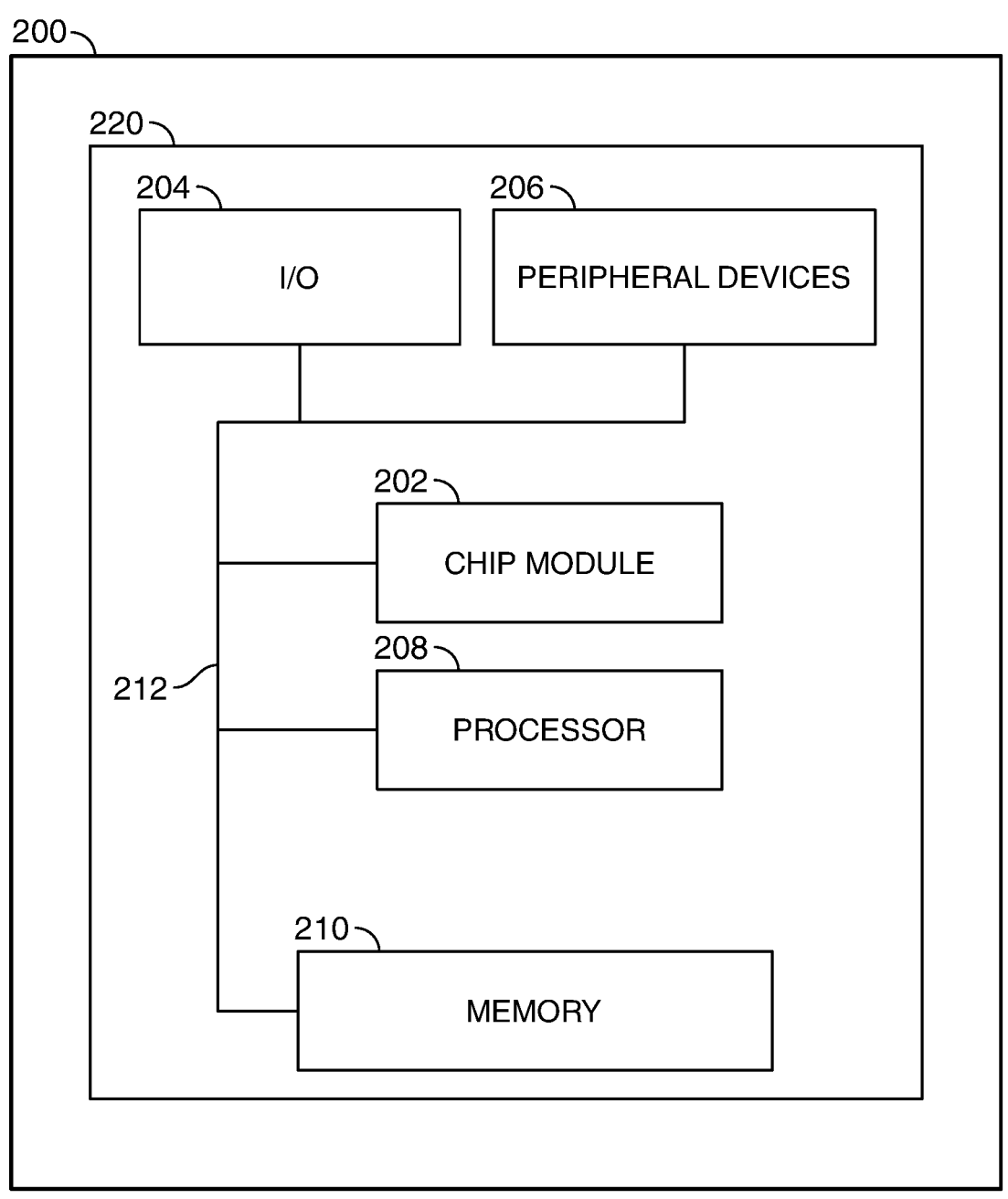
FIG. 2 shows another illustrative diagram in accordance with principles of the invention.

FIG. 2 shows illustrative apparatus 200 that may be configured in accordance with the principles of the disclosure. Apparatus 200 may be a computing device. Apparatus 200 may include one or more features of the apparatus shown in FIG. 1. Apparatus 200 may include chip module 202, which may include one or more integrated circuits and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 119, signals and/or any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
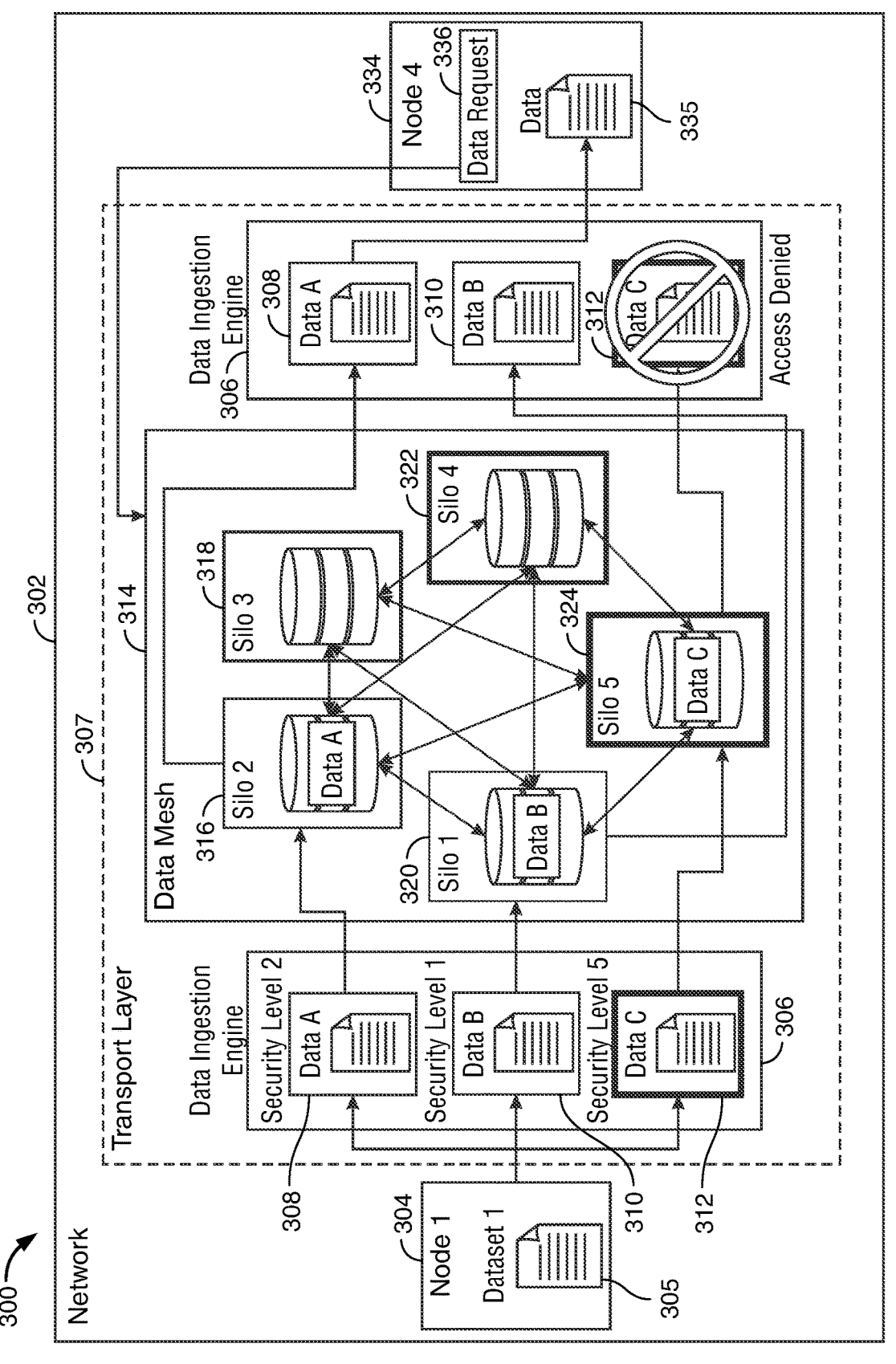
FIG. 3 shows yet another illustrative diagram in accordance with principles of the invention.

FIG. 3 shows illustrative system 300. System 300 may include network 302. Network 302 may include node 304 and node 334. Network 302 may include a plurality of nodes (not shown). Node 304, node 334 and any other nodes included in the network may have one or more features as described above in FIGS. 1 and 2. Node 304 may include dataset 305. Dataset 305 may include data. Node 304 may transmit dataset 304 to data mesh 314. Data mesh may include data silos 316, 318, 320, 322 and 324. Data silos 316, 318, 320, 322 and 324 may be in electronic communication with each other. Data silos 316, 318, 320, 322 and 324 may be configured to transmit data from one silo to another.

Dataset 305 may be transmitted through transport layer 307. Transport layer 307 may include data ingestion engine 306. Data ingestion engine 306 may include an artificial intelligence (AI) model. The AI model may analyze the data included in dataset 305. The AI model may divide dataset 305 into data segment 308, data segment 310 and data segment 312. The AI model may divide dataset 305 into a plurality of data segment. Data ingestion engine 306 may use the AI model to assign a security clearance level to each of the data segments. Data segment 308 may be assigned a level 2 security clearance level. Data segment 310 may be assigned a level 1 security clearance level. Data segment 312 may be assigned a level 5 security clearance level. A level 1 security clearance level may allow access to unclassified data. A level 5 security clearance level may allow access to highly classified data. Security levels in between levels one and five may include varying levels of accessibility to classified data.

Data ingestion engine 306 may transmit data segment 308, data segment 310 and data segment 312 to data mesh 314. Data ingestion engine 306 may store data segment 308, data segment 310 and data segment 312 in data mesh 314. Data ingestion engine 306 may store data segment 308 at data silo 316. Data silo 316 may be assigned a security clearance level. Data silo 316 may be assigned a level 2 security clearance level. Data segment 308 may be stored at data silo 316 because data segment 308 and data silo 316 may be assigned a corresponding security clearance level.

Data ingestion engine 306 may store data segment 310 at data silo 320. Data silo 320 may be assigned a security clearance level. Data silo 320 may be assigned a level 1 security clearance level. Data segment 310 may be stored at data silo 320 because data segment 310 and data silo 320 may be assigned a corresponding security clearance level.

Data ingestion engine 306 may store data segment 312 at data silo 324. Data silo 324 may be assigned a security clearance level. Data silo 324 may be assigned a level 5 security clearance level. Data segment 312 may be stored at data silo 324 because data segment 312 and data silo 324 may be assigned a corresponding security clearance level.

Node 334 may transmit data request 336 to data mesh 314. Data request 336 may request dataset 305. Data ingestion engine may retrieve data segment 308, data segment 310 and data segment 312 from data mesh 314. Data ingestion engine 306 may retrieve data segment 308, data segment 310 and data segment 312 from data silo 316, data silo 320 and data silo 324, respectively.

Node 334 may be assigned a security clearance level. Data ingestion engine 306 may determine if the security level assigned to data segment 308, data segment 310 and data segment 312 is greater than the security clearance level assigned to node 334. Node 334 may be assigned a level 2 security clearance level (not shown). Data segment 308 and data segment 310 may be determined not to have a greater security clearance level than node 334. Data segment 312 may be assigned a security clearance level that is greater than the security clearance level of node 334. Data ingestion engine 306 may block the transmission of data segment 312. Data segment 312 may be stored in data silo 324. Data segment 312 may be deleted. Data ingestion engine 306 may create dataset 335 with remaining data segments 308 and 310. Data ingestion engine 306 may transmit dataset 335 to node 334.

Figure 4:
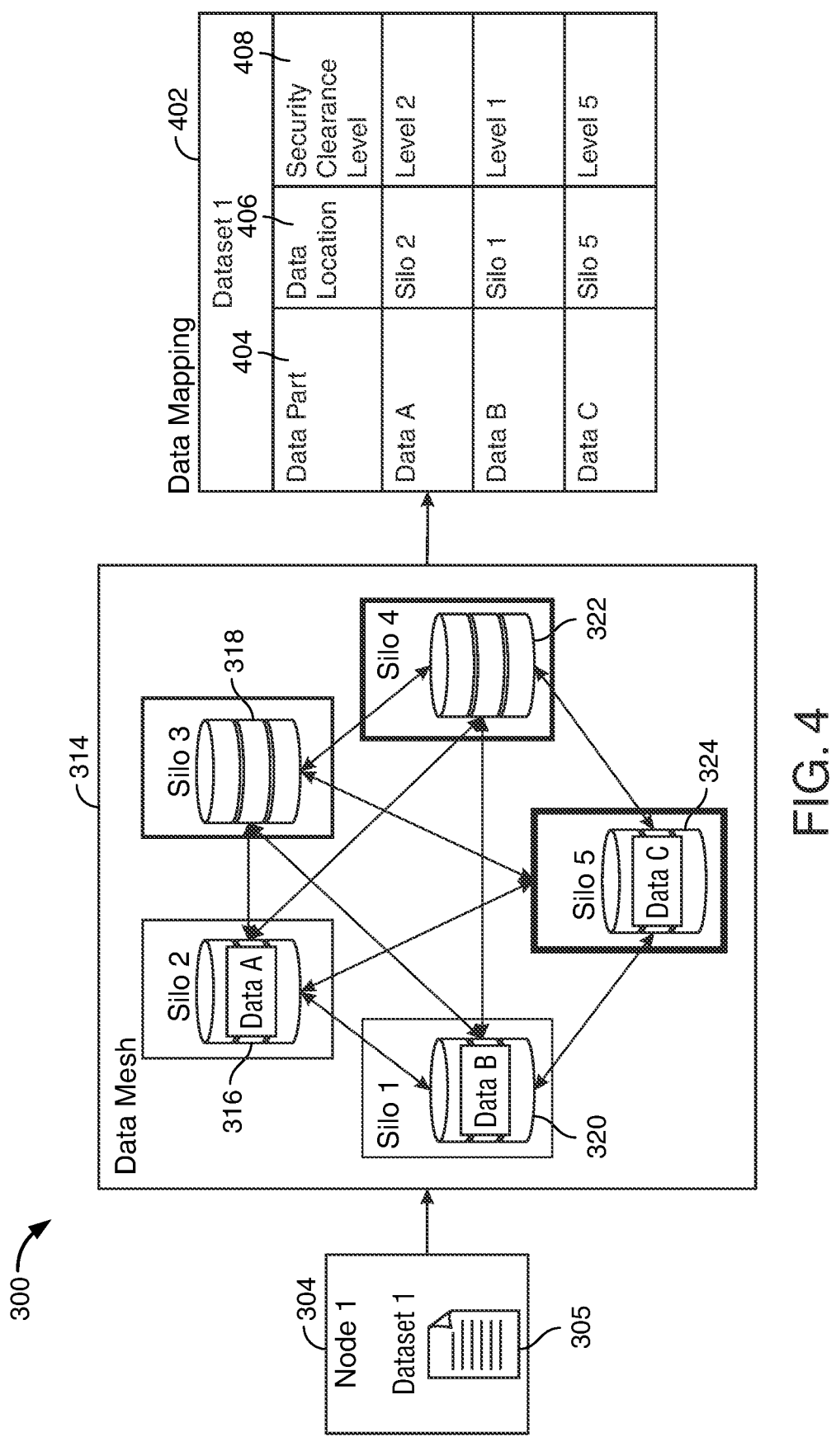
FIG. 4 shows still another illustrative diagram in accordance with principles of the invention.

FIG. 4 shows system 300. When storing dataset 305 at data mesh 314, data ingestion engine 306 may create data mapping 402. Data mapping 402 may include data part 404, data location 406 and security clearance level 408. Data part 402 may include an identifier of the data segment. Data part 404 may include a listing of data A, data B and data C. Data A may correspond to data 316. Data B may correspond to data 320. Data C may correspond to data 324. Data location 406 may include the location of each data part. Data A may be located at silo 2. Data B may be located at silo 1. Data C may be located at silo 5.

Security clearance level 408 may include the assigned security clearance level for each data part. Data A may be assigned a level 2 security clearance level. Data B may be assigned a level 1 security clearance level. Data C may be assigned a level 5 security clearance level. Data ingestion engine 306 may use data mapping 402 to locate the parts of dataset 305 when data ingestion engine 306 receives data request 336 from node 334. Data storage mapping 402 may be updated with a change in location or security level of a data part.

Figure 5:
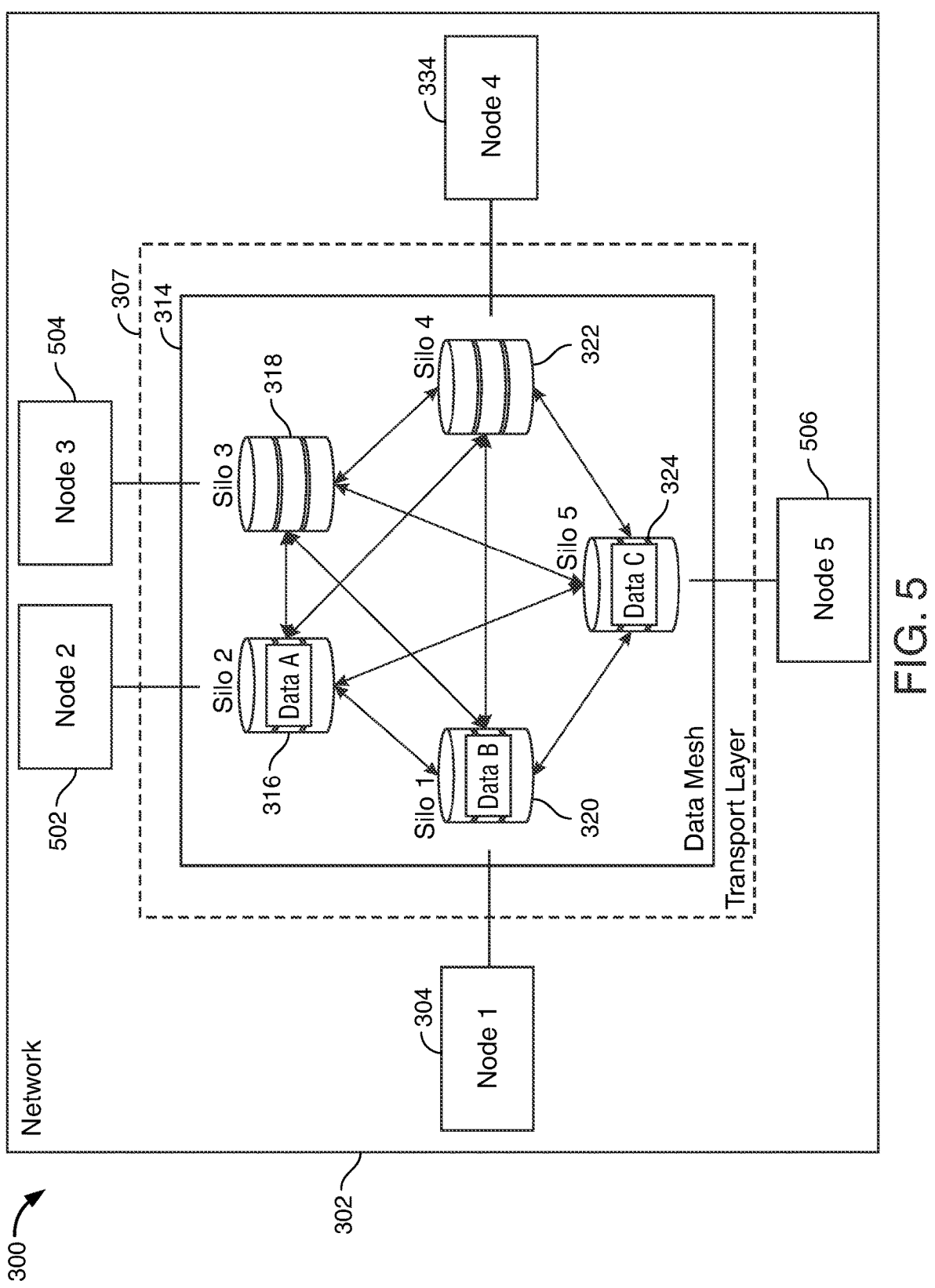
FIG. 5 shows yet another illustrative diagram in accordance with principles of the invention.

FIG. 5 shows system 300. Network 302 may include node 502, node 504 and node 506 in addition to nodes 304 and 306. Node 304 may be associated with data silo 320. Node 502 may be associated with data silo 316. Node 504 may be associated with data silo 318. Node 334 may be associated with data silo 322. Node 506 may be associated with data silo 324.

Figure 6:
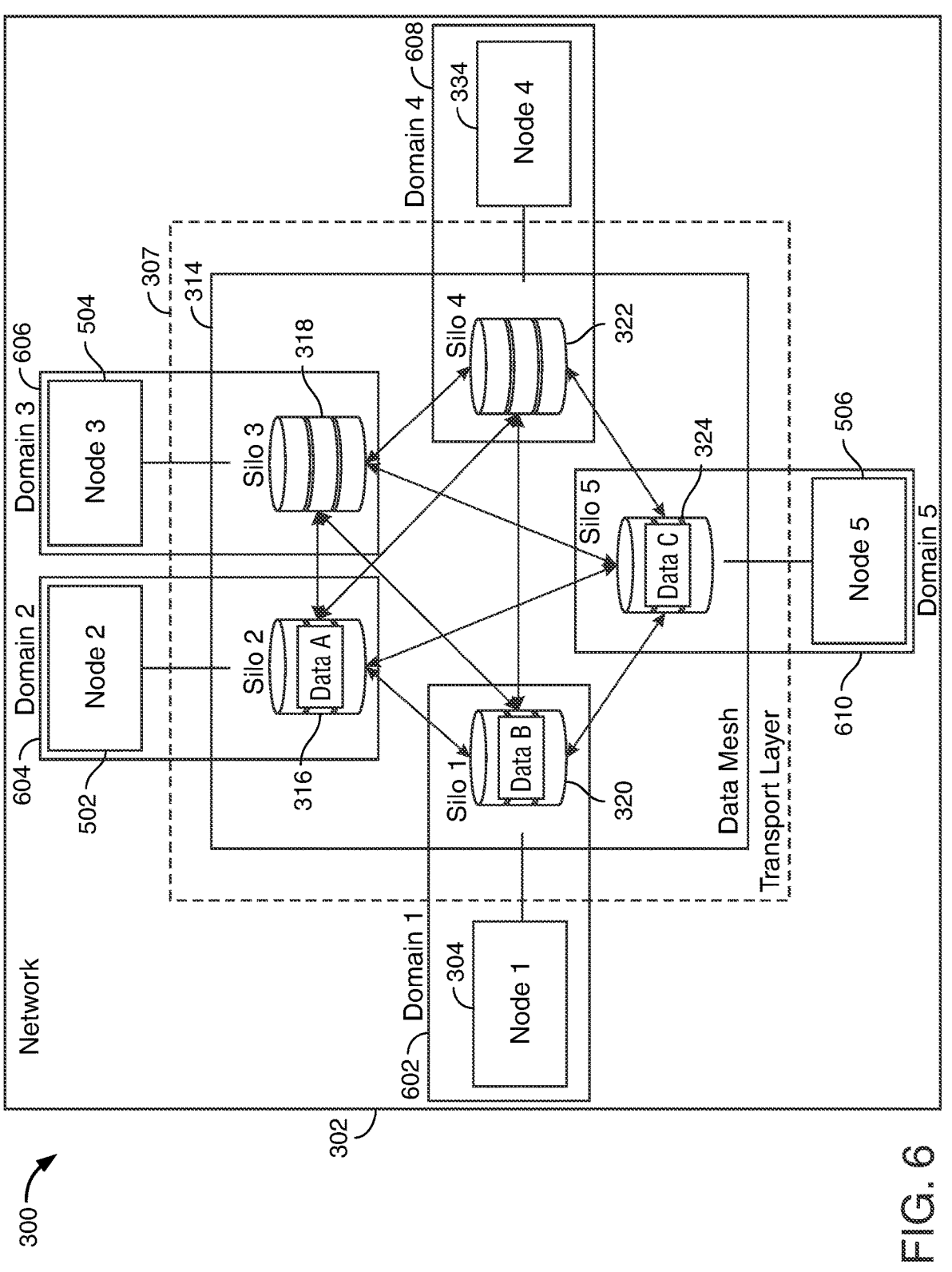
FIG. 6 shows still another illustrative diagram in accordance with principles of the invention.

FIG. 6 shows system 300. Node 304 and data silo 320 may be included in domain 602. Nodes 502 and data silo 316 may be included in domain 604. Node 504 and data silo 318 may be included in domain 606. Node 334 and data silo 322 may be included in domain 608. Node 506 and data silo 324 may be included in domain 610. Domain 602, 604, 606, 608 and 610 may be unique domains. Domains 602, 604, 606, 608 and 610 may each have an assigned security clearance level.

Figure 7:
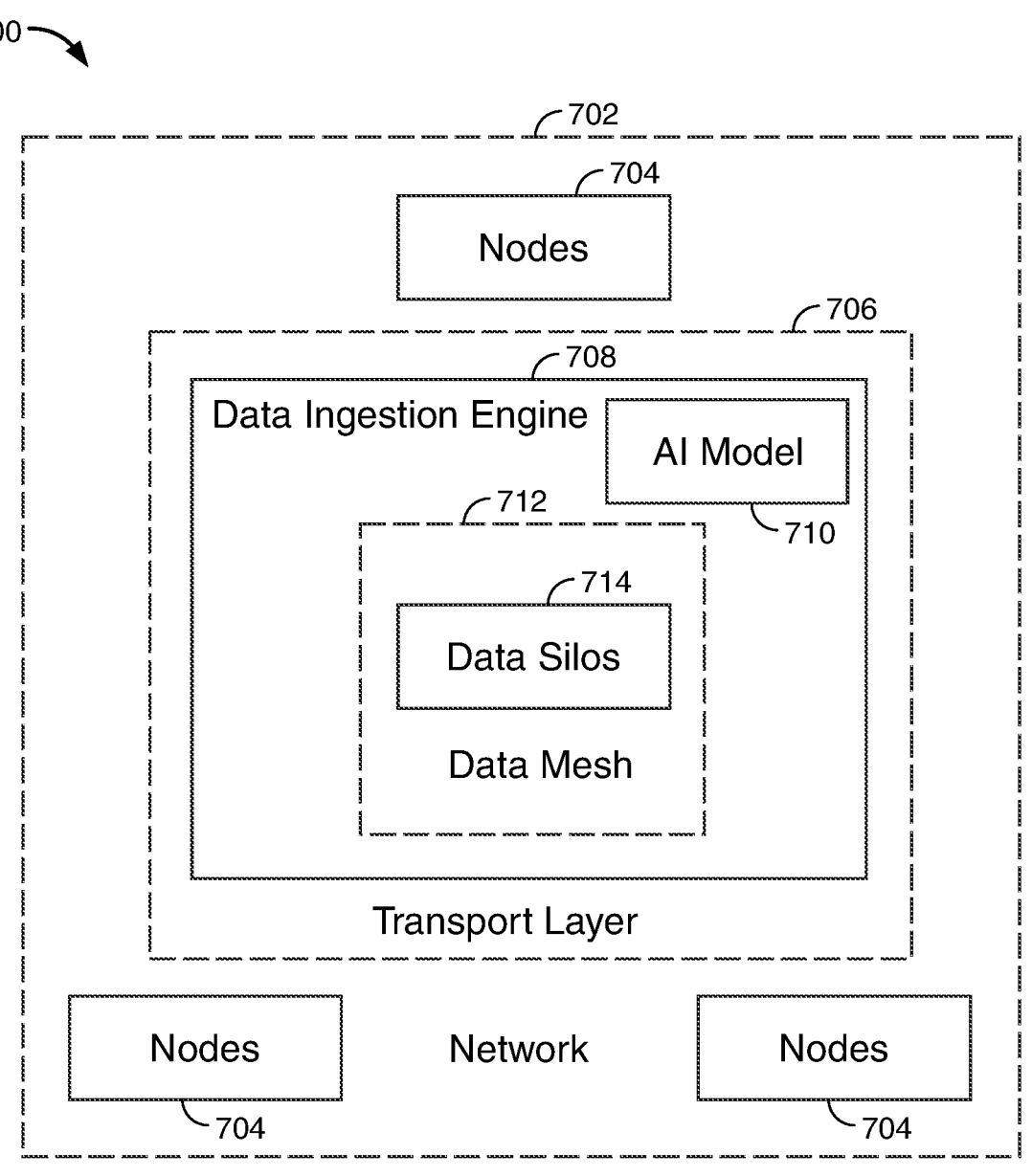
FIG. 7 shows yet another illustrative diagram in accordance with principles of the invention.

FIG. 7 shows illustrative architecture of system 700. System 700 includes network 702. Network 700 may include nodes 704. Network 702 may include transport layer 706. Transport layer 706 may include data ingestion engine 708. Data ingestion engine 708 may include AI model 710. Network 702 may include data mesh 712. Data mesh 712 may include data silos 714. System 700 may be configured for multi-level security-based data storage.

FIG. 8 shows illustrative process 800. Process 800 may occur in systems 300 and 700. Step 802 may include transmitting a dataset from a first node to a data mesh. Step 804 may include receiving the data set at a data ingestion engine. Step 806 may include analyzing the data included in the dataset. Step 808 may include fragmenting the data into a plurality of data fragments. Step 810 may include assigning a security clearance level to each data fragment.

Step 812 may include aggregating the data fragments to form a plurality of data segments. The aggregation may be according to security clearance level. Step 814 may include transmitting each data segment that is assigned a security clearance level to a data silo that has a corresponding security clearance level. Step 816 may include storing each data segment at its corresponding data silo. Step 818 may include creating a storage map of the storage location and security clearance level for each data segment.

Step 820 may include receiving a data request at the data ingestion engine. Step 822 may include retrieving the data segments using the storage map. Step 824 may include determining if one or more of the data segments has an assigned security clearance level that is greater than the security level assigned to the second node. Step 826 may include excluding the one or more data segments determined to have a security clearance level greater than the second node. Step 828 may include combining the remaining data segments to recreate the dataset. Step 830 may include transmitting the recreated dataset to the second node.

Thus, methods and apparatus for a MULTI-SILOED DATABASE are provided. Persons skilled in the art will appreciate that the present disclosure can be practiced by other than the described embodiments, which are presented for purposes of illustration rather than of limitation and that the present disclosure is limited only by the claims that follow.

What is claimed is:

1. A system for providing multi-leveled security-based data storage in a multi-siloed database, the system comprising:

a network comprising a plurality of nodes;
a data mesh comprising a plurality of data silos, each data silo is:
associated with one of the plurality of nodes;
in electronic communication with the remaining data silos included in the plurality of data silos; and
assigned a predetermined security clearance level selected from a plurality of security clearance levels; and
a data ingestion engine running an artificial intelligence model, the data ingestion engine operable to:
receive a dataset comprising data from a node selected from among the plurality of nodes;
analyze the data in response to receipt of the dataset;
fragment the data into a plurality of data fragments;
assign a security clearance level selected from the plurality of security clearance levels to each data fragment;
create a plurality of data segments, where each data segment:
is associated with a security clearance level selected from the plurality of security clearance levels; and
includes one or more data fragments that have an assigned security clearance level that corresponds to the security clearance level associated with each data segment;
transmit and store each data segment to a data silo that has an assigned predetermined security clearance level that corresponds to the security clearance level associated with each data segment; and
create a storage map, said storage map comprising:
each data segment;
each data silo in which each data segment is stored; and
the predetermined security clearance level assigned to each data silo;
wherein the node is a first node, the dataset is a first dataset, and the data ingestion engine is further operable to:
receive a data request, from a second node, requesting the first dataset;
in response to the receipt of the data request, retrieve, using the storage map, a location for each of the plurality of data segments included in the first dataset, each of the plurality of data segments included in the first dataset stored at different data silos within the data mesh; and in response to a determination that one or more of the data segments has an assigned security clearance level that is greater than an assigned security clearance level of the second node:

remove the one or more data segments from the first dataset;

generate a second dataset from a remainder of the first dataset; and transmit the second dataset to the second node.

2. The system of claim 1 wherein the data ingestion engine is configured to store the one or more data segments that were removed from the first dataset in a data silo that corresponds to security clearance levels assigned to the one or more data segments that were removed.

3. The system of claim 1 wherein the data ingestion engine is configured to delete the one or more data segments that were removed from the first dataset.

4. The system of claim 1 wherein the data ingestion engine is further operable to:

receive a data request from a second node requesting a data segment;

in response to the receipt of the data request, retrieve the data segment using the storage map; and in response to a determination that the data segment has an assigned security clearance level that is lower than an assigned security clearance level of the second node, transmit the data segment to the second node.

5. The system of claim 1 wherein the data ingestion engine is further operable to:

receive a data request from a second node requesting a data segment;

in response to the receipt of the data request, retrieve the data segment using the storage map; and in response to a determination that the data segment has an assigned security clearance level that is greater than an assigned security clearance level of the second node, prevent transmission of the data segment to the second node.

6. The system of claim 1 wherein the data ingestion engine is configured to use testing and training datasets to train the artificial intelligence model.

7. The system of claim 1 wherein each data silo and its associated node are configured to operate in a single domain.

8. The system of claim 1 wherein the data ingestion engine is configured to determine a security clearance level for each data fragment using:

analyzed data included in the dataset;

a metadata set of the analyzed data; and a historical background of the analyzed data.

9. The system of claim 1 wherein the data ingestion engine is further operable to:

change a storage location of a data segment, within the data mesh; and update the storage map in response to the change of storage location of the data segment.

10. A method for providing a multi-leveled security-based data storage in a multi-siloed database, the method comprising:

transmitting a dataset from a node to a data mesh, the node included in a network, the network comprised of a plurality of nodes including one or more nodes;

receiving the dataset at a data ingestion engine, the data ingestion engine running an artificial intelligence model, the dataset including data;

analyzing the data in response to receiving the dataset;

fragmenting the data into a plurality of data fragments;

assigning a security clearance level to each data fragment, each security clearance level selected from a plurality of security clearance levels;

creating a plurality of data segments, where each data segment:

is associated with a security clearance level selected from the plurality of security clearance levels; and includes one or more data fragments that have an assigned security clearance level that corresponds to the security clearance level associated with each data segment;

transmitting each data segment to a data silo that has an assigned predetermined security clearance level that corresponds to the security clearance level associated with each data segment, each data silo being included in the data mesh, the data mesh comprising a plurality of data silos, each data silo is:

associated with a node from the one or more nodes;

in electronic communication with the remaining data silos included in the plurality of data silos; and assigned a predetermined security clearance level selected from the plurality of security clearance levels;

storing each data segment in a data silo with a corresponding security clearance level; and creating a storage map, said storage map comprising:

each data segment;

each data silo in which each data segment is stored; and the predetermined security clearance level assigned to each data silo;

wherein the node is a first node, and the dataset is a first dataset, the method further including:

receiving a data request at the data ingestion engine from a second node, the second node included in the network, the data request requesting the first dataset;

in response to the receiving the data request, retrieving using the storage map, a location for each of the plurality of data segments included in the first dataset, each of the plurality of data segments included in the first dataset stored at different data silos within the data mesh; and in response to determining that one or more of the data segments has an assigned security clearance level that is greater than an assigned security clearance level of the second node:

removing the one or more data segments from the first dataset;

generating a second dataset from a remainder of the first dataset; and transmitting the second dataset to the second node.

11. The method of claim 10 further comprising storing the one or more data segments that were removed from the first dataset in a data silo that corresponds security clearance levels assigned to the one or more data segments that were removed.

12. The method of claim 10 further comprising deleting the one or more data segments that were removed from the first dataset.

13. The method of claim 10 further comprising:

receiving a data request from a second node requesting a data segment;

in response to receiving the data request, retrieving the data segment using the storage map; and in response to determining that the data segment has an assigned security clearance level that is lower than an assigned security clearance level of the second node, transmitting the data segment to the second node.

14. The method of claim 10 further comprising:

receiving a data request from a second node requesting a data segment;

in response to receiving the data request, retrieving the data segment using the storage map; and in response to determining that the data segment has an assigned security clearance level that is greater than an assigned security clearance level of the second node, preventing transmission of the data segment to the second node.

15. The method of claim 10 further comprising using testing and training datasets to train the artificial intelligence model.

16. The method of claim 10 wherein each data silo and its associated node are configured to operate in a single domain.

17. The method of claim 10 further comprising determining a security clearance level for each data fragment using:

analyzed data included in the dataset;

a metadata set of the analyzed data; and a historical background of the analyzed data.

18. The method of claim 10 the method further comprising:

changing a storage location of a data segment, within the data mesh; and updating the storage map in response to the change of location of the data segment.

\* \* \* \* \*